US006667893B2

(12) United States Patent
Daun-Lindberg et al.

(10) Patent No.: US 6,667,893 B2
(45) Date of Patent: Dec. 23, 2003

(54) PHASE AND FREQUENCY SHIFTED CONTROLLER FOR INTERLEAVED ZVS FORWARD POWER CONVERTER

(75) Inventors: Timothy Charles Daun-Lindberg, Rochester, MN (US); Richard John Fishbune, Rochester, MN (US); Thai Quoc Ngo, Rochester, MN (US); Scott Douglas Strand, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/132,596

(22) Filed: Apr. 25, 2002

(65) Prior Publication Data
US 2003/0202365 A1 Oct. 30, 2003

(51) Int. Cl.[7] .............................................. H02M 3/335
(52) U.S. Cl. .............................. 363/65; 363/67; 363/71; 363/21.06
(58) Field of Search ............................. 363/65, 67, 71, 363/21.04, 21.05, 21.06, 123

(56) References Cited

U.S. PATENT DOCUMENTS

| 4,195,333 | A | * | 3/1980 | Hedel | 363/21.07 |
|---|---|---|---|---|---|
| 4,290,101 | A | * | 9/1981 | Hergenhan | 363/65 |
| 4,313,155 | A | * | 1/1982 | Bock et al. | 363/21.08 |
| 4,635,179 | A | * | 1/1987 | Carsten | 363/70 |
| 4,763,237 | A | * | 8/1988 | Wieczorek | 363/20 |
| 4,779,184 | A | * | 10/1988 | White | 363/65 |
| 5,008,795 | A | * | 4/1991 | Parsley et al. | 363/20 |
| 5,680,034 | A | * | 10/1997 | Redl | 363/21.03 |
| 5,781,421 | A | * | 7/1998 | Steigerwald et al. | 363/21.08 |

OTHER PUBLICATIONS

U.S. patent application Ser. No. 09/717,622 filed Nov. 21, 2000, "High Efficiency Dual Forward Power Converter".

* cited by examiner

Primary Examiner—Shawn Riley
(74) Attorney, Agent, or Firm—Joan Pennington (57) ABSTRACT

A power converter controller and a method for controlling a power converter are provided. The power converter includes first and second power transformers, each having first and second primary windings and a secondary winding; and first and second switches that alternately couple primary windings of the first and second power transformers to an input power source. The power converter controller receives a feedback signal, such as a DC power output voltage from the power converter. A voltage controlled oscillator responsive to the feedback signal provides a variable frequency signal. A phase shift controller coupled to the voltage controlled oscillator provides a variable phase shifted signal responsive to the variable frequency signal. Gate drive signals are decoded using the variable frequency signal and variable phase shifted signal for driving first and second switches of the power converter.

13 Claims, 6 Drawing Sheets

V(RAMP1)

FIG. 2B

V(PHASE)

PHASE AND FREQUENCY SHIFTED CONTROLLER FOR INTERLEAVED ZVS FORWARD POWER CONVERTER

FIELD OF THE INVENTION

The present invention relates generally to DC/DC power conversion and more particularly, relates to an optimized phase and frequency shifted power converter controller for an interleaved zero voltage switching (ZVS) forward power converter.

DESCRIPTION OF THE RELATED ART

In regulated switching DC power supplies, DC/DC power converter circuits accomplish transformation of a DC voltage from one level to another. Solid-state devices, such as transistors, typically are operated as switches, either completely ON or completely OFF with these switching power converters. Since the switching devices are not operated in their active region, this operational mode results in lower power dissipation than linear power supplies. Increasing switching speeds, higher voltage and current ratings of the switching devices are some of the advantages that have increased the popularity of switching power supplies.

For example, switching power supplies may have a switching frequency of 100 KHz or higher. The high switching frequencies permit the components utilized in the construction of the power converter, such as capacitors, inductors and transformers, to be physically small. The overall generally small size also has increased the popularity of switching power supplies.

Some known switching power converters accomplish higher efficiencies by zero voltage switching (ZVS). ZVS power converters can minimize switching losses.

A need exists for an improved power converter controller for various power converters. It is desirable to provide such an improved power converter controller that enables more effective controlled operation of power converters and that reduces output ripple. It is desirable to provide an improved power converter controller for an interleaved zero voltage switching (ZVS) forward power converter.

SUMMARY OF THE INVENTION

A principal object of the present invention is to provide an improved power converter controller for power converters. Other important objects of the present invention are to provide such an improved power converter controller for an interleaved zero voltage switching (ZVS) forward power converter; to provide such an improved power converter controller substantially without negative effect and that overcome many of the disadvantages of prior art arrangements.

In brief, a power converter controller and a method for controlling a power converter are provided. The power converter includes first and second power transformers, each having first and second primary windings and a secondary winding; and first and second switches that alternately couple primary windings of the first and second power transformers to an input power source. The power converter controller receives a feedback signal from the power converter. A voltage controlled oscillator responsive to the feedback signal provides a variable frequency signal. A phase shift controller coupled to the voltage controlled oscillator provides a variable phase shifted signal responsive to the variable frequency signal.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE EMBODIMENTS

Figure 1A:
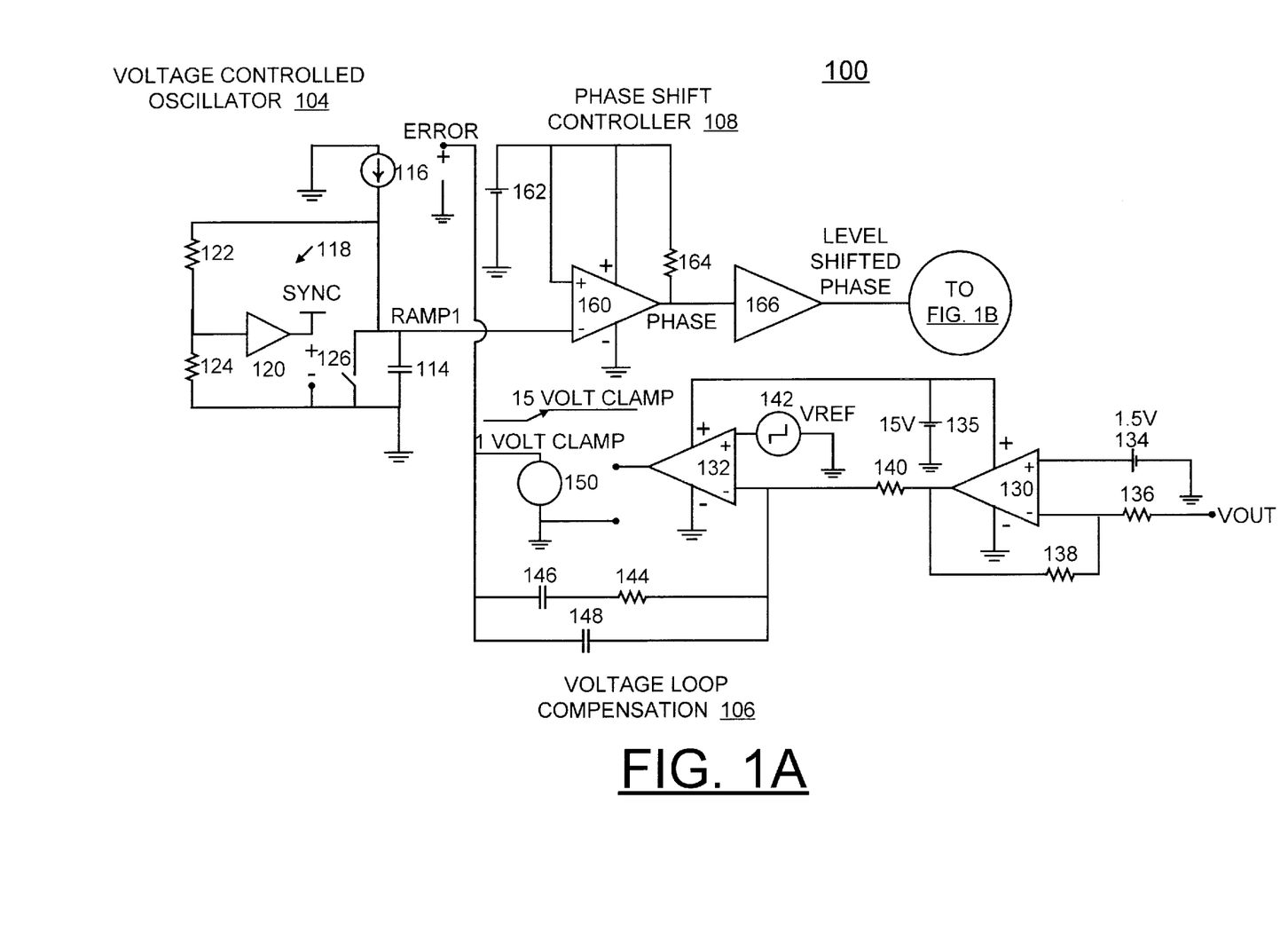
FIGS. 1A and 1B together provide a schematic and block diagram representation of an exemplary optimized phase and frequency shifted power converter controller for an interleaved zero voltage switching (ZVS) forward power converter in accordance with the preferred embodiment.
Figure 1B:
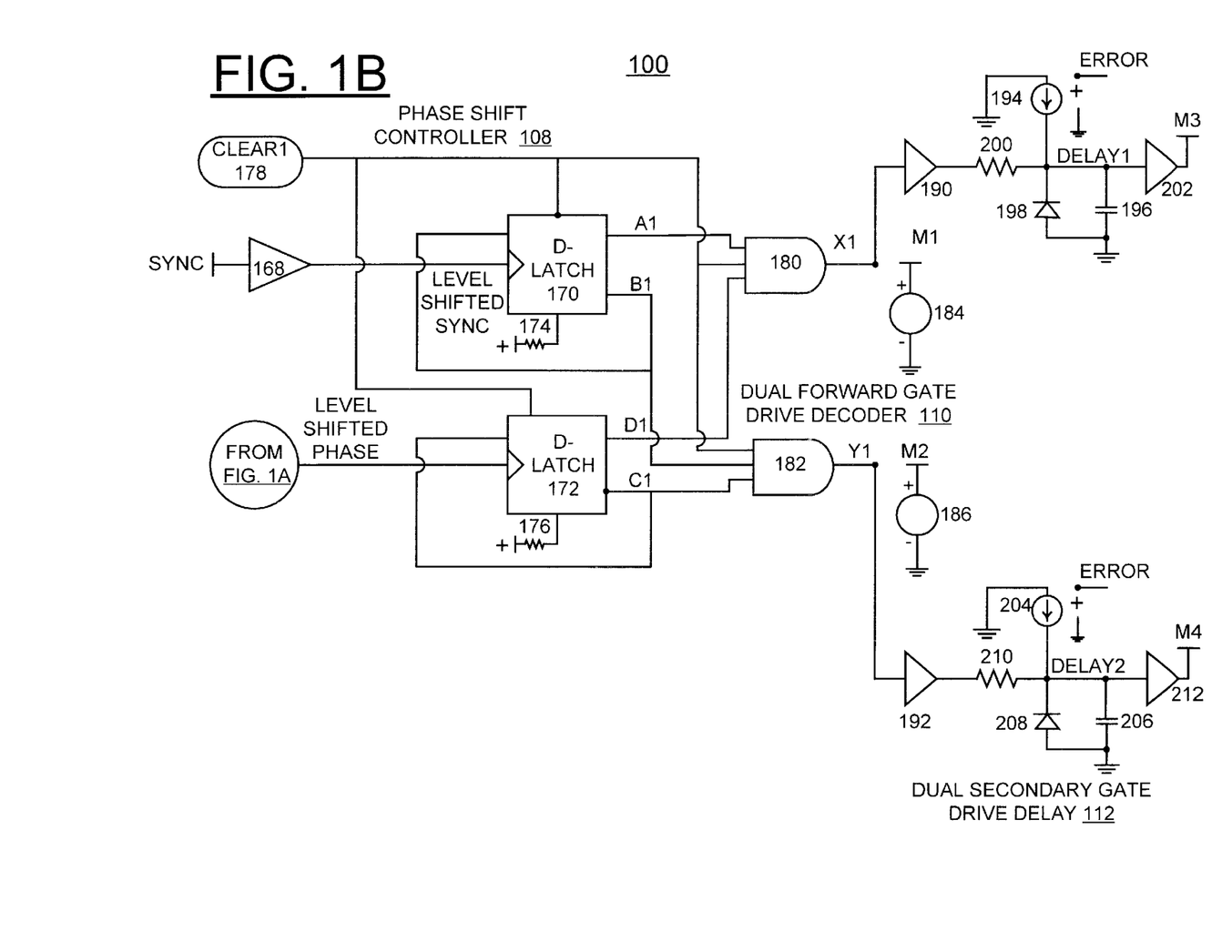

Having reference now to the drawings, in FIGS. 1A and 1B, there is shown exemplary power converter controller of the preferred embodiment generally designated by the reference character 100.

Figure 1C:
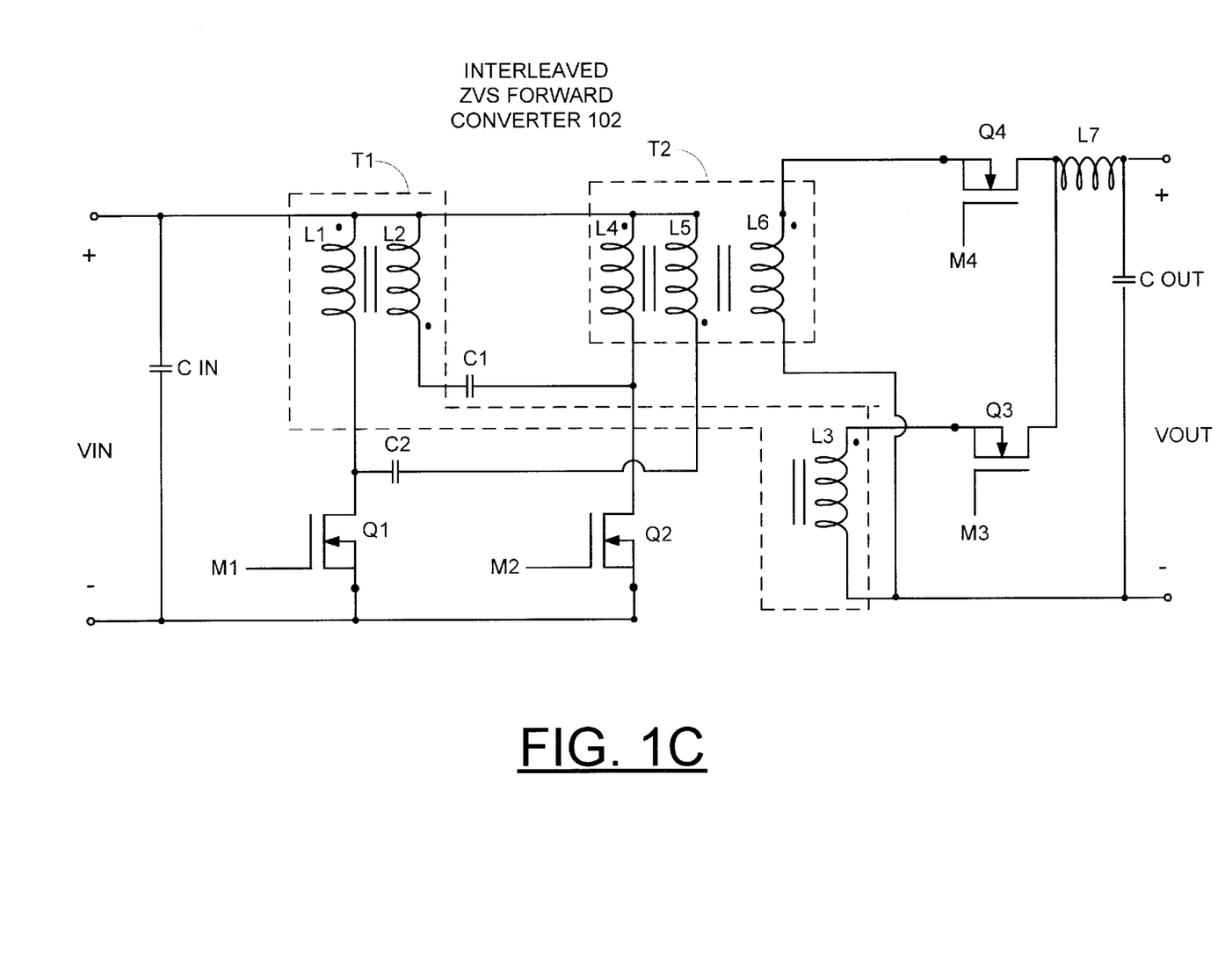
FIG. 1C is a schematic and block diagram representation of an exemplary interleaved zero voltage switching (ZVS) forward power converter in accordance with the preferred embodiment.

In accordance with features of the invention, the power converter controller 100 provides optimized phase and frequency shifted methods of controlling a power converter, such as an exemplary interleaved zero voltage switching (ZVS) forward power converter 102 illustrated in FIG. 1C. The power converter controller 100 generally enables more effective controlled operation of power converters. The power converter controller 100 reduces output ripple, particularly for light load current operation of power converters.

Referring to FIG. 1C, the ZVS forward power converter 102 includes a DC power input VIN, an input capacitor C IN, a DC power output VOUT, and DC first and second power transformers T1, T2, respectively having first and second primary windings L1, L2 and L4, L5 of opposite polarity and a secondary winding L3 and L6. The first and second power transformers T1, T2 are tightly coupled to reduce leakage inductance and have equal turn ratios. First and second coupling capacitors C1, C2 couple respective primary windings L2, L4 and L1, L5 of the first and second power transformers T1, T2 to first and second switches Q1, Q2. The first and second switches Q1, Q2 respectively receive gate drive inputs M1, M2 from the power converter controller 100 of the preferred embodiment and alternately couple the primary windings L2, L4 and L1, L5 of the first and second power transformers T1, T2 to the DC power input VIN. The first and second switches Q1, Q2 are field effect transistors (FETs), such as metal oxide semiconductor FETs (MOSFETs). Third and fourth switches Q3 and Q4 respectively receive gate drive inputs M3, M4 from the power converter controller 100 of the preferred embodiment and alternately couple the secondary winding L3 and L6 of the first and second power transformers T1, T2 to the DC power output VOUT. Alternatively, diodes can be used instead of the third and fourth switches Q3 and Q4. An inductor L7 is coupled between the junction of third and fourth switches Q3 and Q4 and an output capacitor C OUT that is connected across the DC power output VOUT.

Among the primary components of the power converter controller 100 are a voltage controlled oscillator 104, a voltage loop compensation 106, a phase shift controller 108, a dual forward converter gate drive decoder 110, and an optional dual secondary gate drive delay 112. The voltage loop compensation 106 provides the error voltage for the voltage controlled oscillator 104 to provide a variable frequency as a function of the error voltage. Phase shift controller 108 coupled to the voltage controlled oscillator 104 provides phase shifting as a function of the frequency. Dual forward converter gate drive decoder 110 provides dual gate drive outputs X1, Y1 for driving first and second switches Q1, Q2 of the ZVS forward power converter 102. Dual secondary gate drive delay 112 provides dual gate drive outputs M3, M4 delayed as a function of the error voltage for driving third and fourth switches Q3, Q4 of the ZVS forward power converter 102. In a power converter using diodes instead of the third and fourth switches Q3 and Q4 to couple the secondary winding L3 and L6 of the first and second power transformers T1, T2 to the DC power output VOUT, then dual secondary gate drive delay 112 is not required.

Voltage controlled oscillator 104 provides a voltage controlled oscillator function by charging of a capacitor 114 with a voltage controlled current source 116. A voltage output of the voltage loop compensation 106 labeled ERROR is coupled to the voltage controlled current source 116 controlling the current produced by the current source 116. Voltage controlled oscillator 104 includes a comparator 118 formed by a Schmitt trigger device 120 and a pair of biasing resistors 122, 124. Comparator 118 senses the peak voltage of the capacitor 114 at a node labeled RAMP1 and producing an output SYNC. Comparator 118 resets when the peak voltage RAMP1 reaches an internal reference voltage. A switch 126 at the output of comparator 118 closes to discharge the capacitor 114 when the comparator 118 resets. The frequency of the voltage controlled oscillator 104 is proportional to the voltage output ERROR of the voltage loop compensation 106. Voltage controlled oscillator 104 produces a higher frequency with a high voltage output ERROR coupled to the voltage controlled current source 116.

Voltage loop compensation 106 receives a feedback signal labeled VOUT from the power converter 102 and produces the voltage output ERROR. Voltage loop compensation 106 includes a pair of operational amplifiers 130 and 132. The feedback signal VOUT is applied to an inverting input of the operational amplifier 130 and a voltage source 134, shown as 1.5V is applied to non-inverting input of the operational amplifier 130. A voltage source 135, shown as 15V, and ground are respectively applied to the + and − inputs of operational amplifiers 130 and 132. The operational amplifier 130 is configured for unity gain with a pair of biasing resistors 136, 138 respectively connected to the inverting input coupling the feedback signal VOUT and from the inverting input to an output of the operational amplifier 130. The feedback signal VOUT output of operational amplifier 130 is coupled via a resistor 140 to an inverting input of the operational amplifier 132. A voltage reference 142 labeled VREF is applied to the non-inverting input of the operational amplifier 132. Frequency response of the operational amplifier 132 is set with biasing resistor 144 connected in series with a capacitor 146 and a capacitor 148 connected in parallel with the series connected resistor 144 and capacitor 146 from the inverting input to an output of the operational amplifier 132. The voltage output ERROR of the operational amplifier 132 is limited by a voltage clamp 150 between a minimum labeled 1 VOLT CLAMP and a maximum labeled 15 VOLT CLAMP.

While the output voltage VOUT of the from the power converter 102 is shown as the feedback signal applied to the voltage loop compensation 106, it should be understood that the feedback signal input to the power converter controller 100 can be derived from other sources, such as input voltage, load current and input current of the power converter, such as an exemplary interleaved zero voltage switching (ZVS) forward power converter 102 illustrated in FIG. 1C.

Phase shift controller 108 uses the capacitor ramp voltage RAMP1 to create a dead time at the driver outputs (X1, Y1) of the dual forward date drive decoder 110. Phase shift controller 108 includes a phase shift amplifier 160 receiving the RAMP1 at an inverting input and receiving a reference voltage 162 at a non-inverting input with a bias resistor 164 connected from the reference voltage 162 to the output of operational amplifier 160. Phase shift amplifier 160 produces a phase shifted output voltage labeled PHASE. A pair of voltage level shifters 166 and 168, for example Schmitt triggers, coupled to the outputs of phase shifter amplifier 160 and VCO 104 respectively provides voltage level shifted outputs labeled LEVEL SHIFTED PHASE and LEVEL SHIFTED SYNC respectively applied to a pair of D-latches 170, 172. The voltage level shifted SYNC signal is used to toggle the D-latch 170 setting the frequency of the controller 100. The voltage level shifted PHASE signal is used to toggle the D-latch 172 delaying the triggering of the second D-latch 172 relative to D-latch 170. A respective biasing resistor 174, 176 is coupled to D-latches 170, 172. D-latches 170, 172 respectively provide complementary outputs labeled A1, B1 and C1, D1. A reset input 178 labeled CLEAR1 is coupled to D-latches 170, 172 to provide a reset signal at start-up.

While a fixed voltage 162 is shown in the phase shift controller 108, it should be understood that a voltage modulated inversely proportional to the error voltage could be used to further vary the dead time, for example, to optimize the resonant transition of switching devices Q1 and Q2 of the ZVS forward power converter 102 to maximum power delivered.

Dual forward converter gate drive decoder 110 includes a pair of NAND gates 180, 182 providing dual gate drive outputs X1, Y1. NAND gates 180, 182 are three-input gates. NAND gate 180 receives the CLEAR1 reset input 178, A1 output of D-latch 170 and D1 output of D-latch 172. NAND gate 182 receives the CLEAR1 reset input 178, B1 output of D-latch 170 and C1 output of D-latch 172. NAND gates 180, 182 respectively provide the dual gate drive outputs X1, Y1. A pair of voltage level multipliers 184, 186 is coupled to outputs X1, Y1 of NAND gates 180, 182 providing dual gate drive outputs M1, M2 for driving first and second switches Q1, Q2 of the ZVS forward power converter 102.

Dual secondary gate drive delay 112 provides dual gate drive outputs M3, M4 delayed as a function of the error voltage for driving third and fourth switches Q3, Q4 of the ZVS forward power converter 102. Dual secondary gate drive delay 112 include first and second buffers 190, 192 respectively coupling the dual gate drive outputs X1, Y1 to variable delay functions that provides dual gate drive outputs M3, M4.

A variable delayed output of drive signal X1 indicated as DELAY1 is provided by a voltage controlled current source 194 charging a capacitor 196, a diode 198 connected across capacitor 196, and a resistor 200. The voltage ERROR output of the voltage loop compensation 106 is coupled to the voltage controlled current source 194 controlling the current produced by the voltage controlled current source 194. A variable DELAY 1 signal is coupled by a drive buffer 202 providing the gate drive outputs M3.

A variable delayed output of drive signal Y1 indicated as DELAY2 similarly is provided by a voltage controlled current source 204 charging a capacitor 206, a diode 208 connected across capacitor 206, and a resistor 210. The voltage ERROR output of the voltage loop compensation 106 is coupled to the voltage controlled current source 204 controlling the current produced by the voltage controlled current source 204. A variable DELAY 2 signal is coupled by a drive buffer 212 providing the gate drive outputs M4.

Figure 2A:
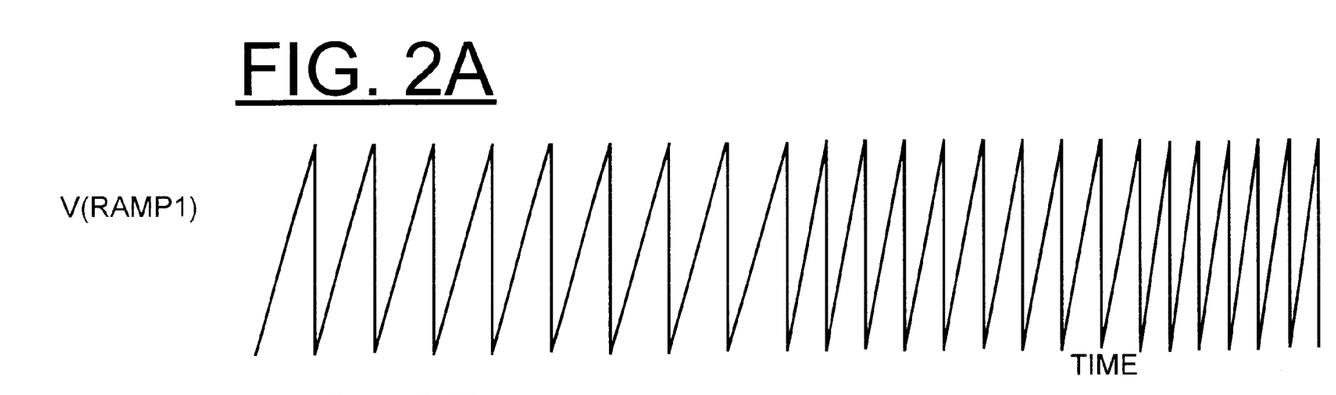
FIGS. 2A, 2B, 2C, 2D, 2E and 2F are exemplary timing diagrams to generally illustrate functions of the exemplary optimized phase and frequency shifted power converter controller of FIGS. 1A and 1B in accordance with the preferred embodiment.
Figure 2B:
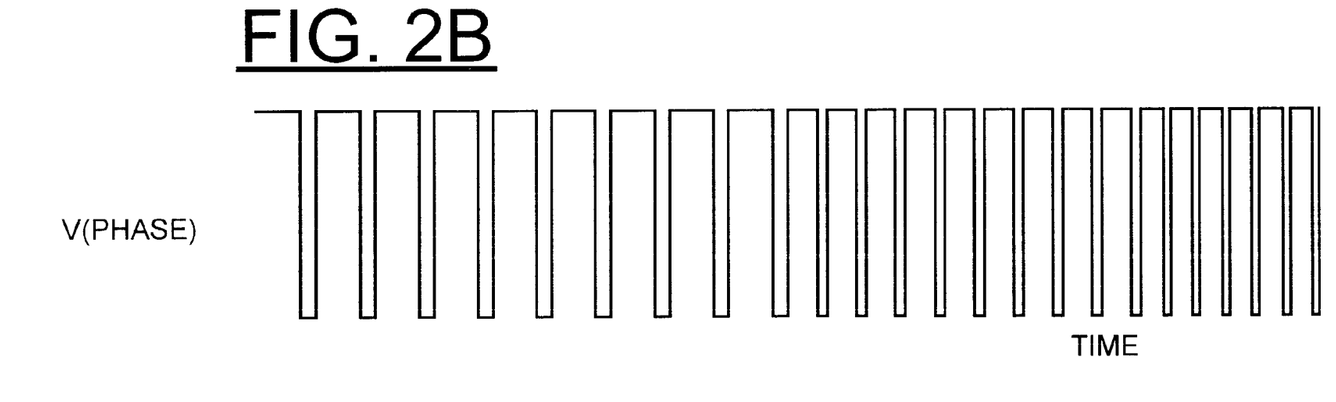
Figure 2C:
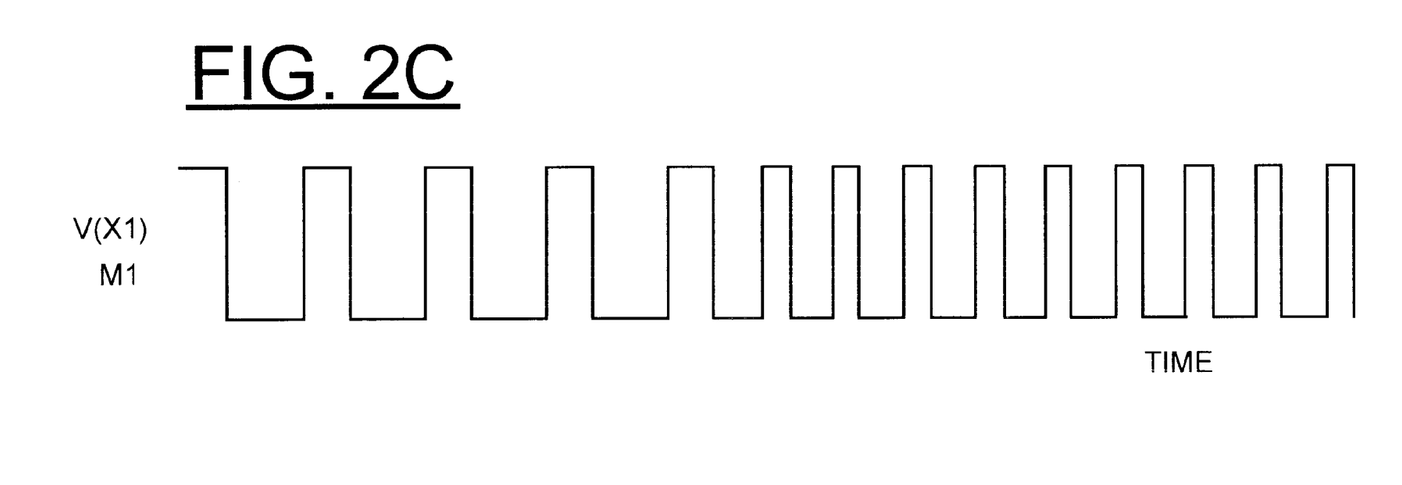
Figure 2D:
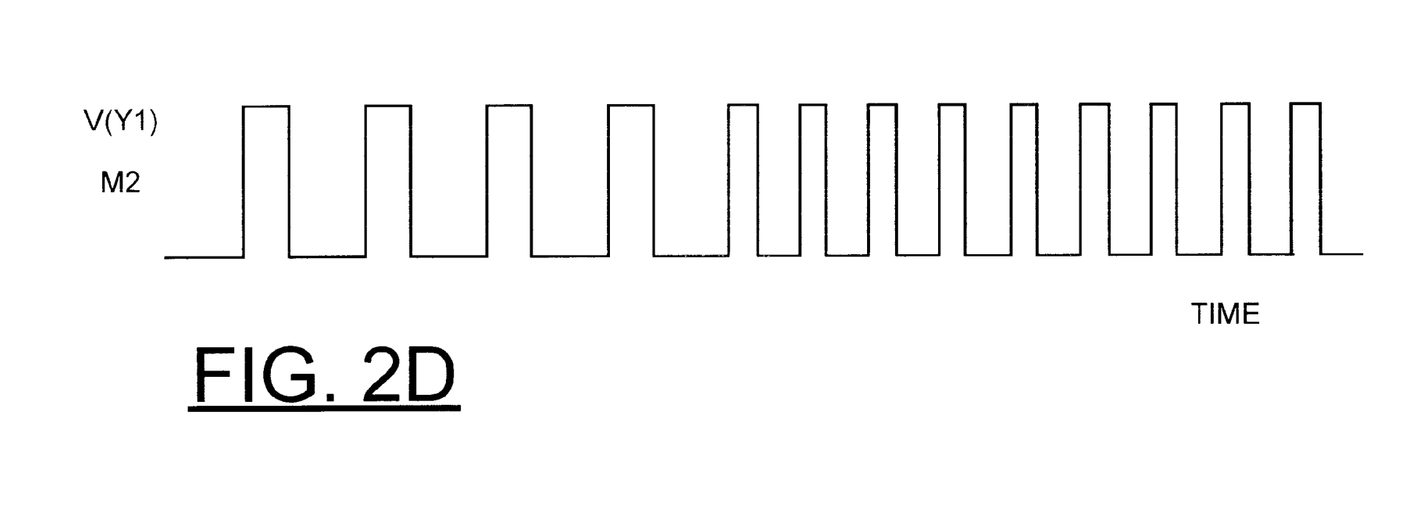
Figure 2E:
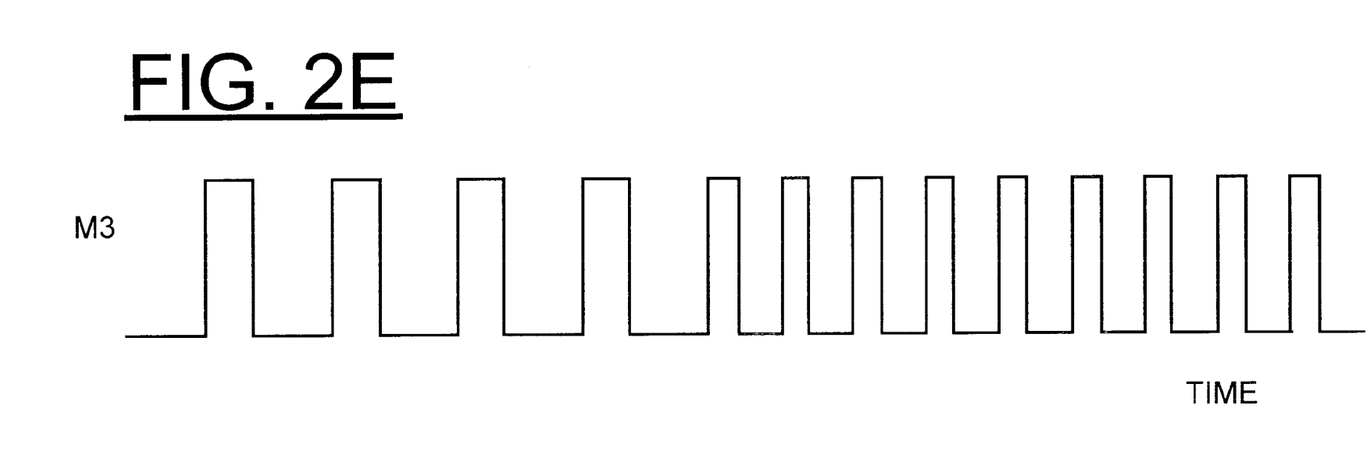
Figure 2F:
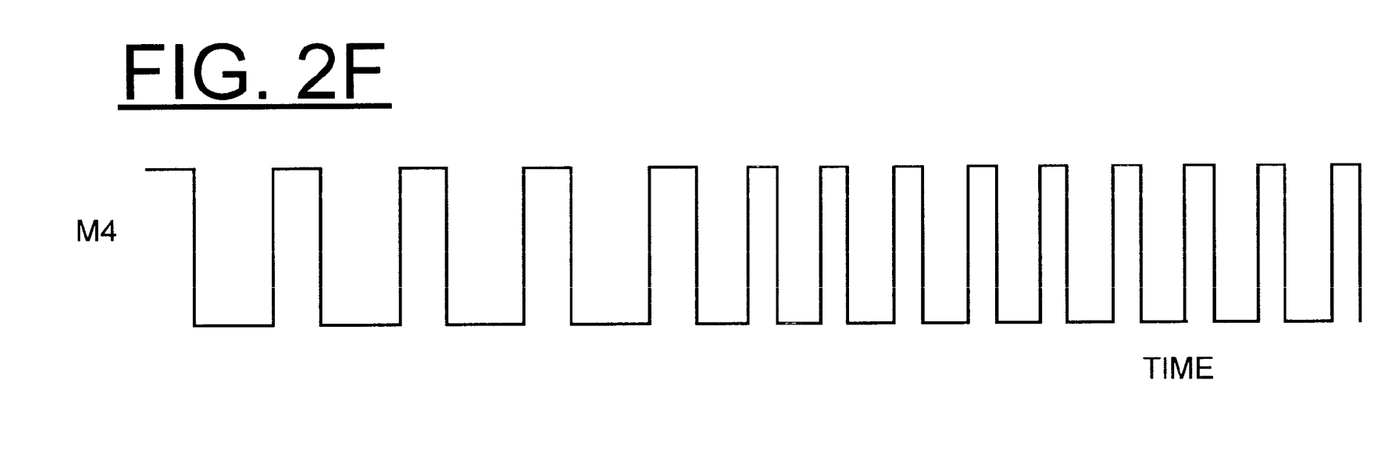

Referring to FIGS. 2A, 2B, 2C, 2D, 2E and 2F, exemplary simulated waveforms are shown to generally illustrate functions of the exemplary optimized phase and frequency shifted power converter controller 100 in accordance with the preferred embodiment. FIG. 2A illustrates the voltage controlled oscillator output V(RAMP1) and FIG. 2A illustrates the trigger voltage V(PHASE) for the phase shift controller 108. FIGS. 2C and 2D illustrate waveforms V(X1) M1, and V(Y1) M2 provided from the controller 100 to gate drive signals for the first and second power FETs Q1, Q2. FIGS. 2E and 2F illustrate waveforms M3, and M4 provided from the controller 100 to gate drive signals for driving third and fourth switches Q3, Q4 of the ZVS forward power converter 102.

While the present invention has been described with reference to the details of the embodiments of the invention shown in the drawing, these details are not intended to limit the scope of the invention as claimed in the appended claims.

What is claimed is:

1. A power converter controller for controlling a dual forward power converter, said power converter including first and second power transformers, each having a first primary winding and a second primary winding and a secondary winding, and first and second switches that alternately couple said first primary winding and said second primary winding of said first and second power transformers to an input power source, said power converter controller comprising:
   a feedback signal from said power converter;
   a voltage controlled oscillator responsive to said feedback signal for providing a variable frequency signal;
   a phase shift controller coupled to said voltage controlled oscillator for providing a variable phase shifted signal responsive to said variable frequency signal;
   third and fourth field effect transistor (FET) switches that alternately couple said first and second power transformers to an output power load; and
   a dual secondary drive delay stage for providing dual gate drive signal outputs for driving said third and fourth FET switches.

2. A power converter controller for controlling a power converter as recited in claim 1 includes a voltage loop compensation function receiving said feedback signal and providing an error signal applied to said voltage controlled oscillator.

3. A power converter controller for controlling a power converter as recited in claim 2 wherein said voltage controlled oscillator includes a voltage controlled current source operatively controlled by said error signal; said voltage controlled current source charging to a capacitor.

4. A power converter controller for controlling a power converter as recited in claim 3 includes a comparator sensing a ramp voltage of said capacitor and said comparator resets at a predefined level of said ramp voltage and discharges said capacitor.

5. A power converter controller for controlling a power converter as recited in claim 4 wherein said phase shift controller produces a phase shifted output voltage responsive to said ramp voltage of said capacitor.

6. A power converter controller for controlling a power converter as recited in claim 5 wherein said phase shift controller includes a pair of latches respectively receiving a trigger input of said variable frequency signal output of said voltage controlled oscillator and said phase shifted output voltage.

7. A power converter controller for controlling a power converter as recited in claim 6 includes logic gates for combining outputs of said latches and providing dual drive signal outputs for driving said first and second switches.

8. A power converter controller for controlling a power converter as recited in claim 7 wherein said first and second switches comprising field effect transistors and said dual drive signal outputs are gate input signals applied to said field effect transistors.

9. A power converter controller for controlling a power converter as recited in claim 1 wherein said dual secondary drive delay stage receives said dual drive signal outputs for driving said first and second switches and includes first and second voltage controlled current sources operatively controlled by said error signal; each said voltage controlled current source charging to a respective capacitor and providing a respective delayed signal output dual drive signal outputs for driving said third and fourth FET switches.

10. A power converter controller for controlling a dual forward power converter as recited in claim 9 wherein said voltage controlled oscillator includes a voltage controlled current source operatively controlled by said error signal; said voltage controlled current source charging to a capacitor and a comparator sensing a ramp voltage of said capacitor; and said comparator resetting at a predefined level of said ramp voltage and discharging said capacitor.

11. A power converter controller for controlling a dual forward power converter as recited in claim 10 wherein said phase shift controller coupled to said voltage controlled oscillator receiving said ramp voltage of said capacitor and said phase shift controller produces a phase shifted output voltage responsive to said capacitor ramp voltage.

12. A power converter controller for controlling a dual forward power converter, said power converter including first and second power transformers, and first and second field effect transistor (FET) switches that alternately couple said first and second power transformers to an input power source, said power converter controller comprising:
   a feedback signal from said power converter;
   a voltage loop compensation receiving said feedback signal from said power converter and providing an error signal;
   a voltage controlled oscillator responsive to said error signal for providing a variable frequency signal;
   a phase shift controller coupled to said voltage controlled oscillator for providing a variable phase shifted signal; and
   a gate drive decoder receiving said variable phase shifted signal and said variable frequency signal and providing dual gate drive outputs for driving said first and second FET switches;
   third and fourth field effect transistor (FET) switches that alternately couple secondary windings of said first and second power transformers to an output power load; and
   a dual secondary drive delay stage for providing dual delayed gate drive signals for driving said third and fourth FET switches.

13. A method for controlling a dual forward power converter, said power converter including first and second power transformers, and first and second switches that alternately couple said first and second power transformers to an input power source, and third and fourth switches that alternately couple secondary windings of said first and second power transformers to an output power load, said method comprising the steps of:

receiving a feedback signal from said power converter;

generating an error signal responsive to said feedback signal;

generating a variable frequency signal responsive to said error signal;

providing a variable Phase shifted signal responsive to said variable frequency signal;

combining said variable frequency signal and said variable phase shifted signal for driving said first and second switches of said power converter; and generating dual delayed drive signals for driving said third and fourth switches.

* * * * *